March 3, 1936. H. A. W. KLINKHAMER 2,032,705
POLYPHASE TRANSFORMER
Filed April 20, 1934 2 Sheets-Sheet 1

Inventor:
H. A. W. Klinkhamer,
by E. F. Wendroth
Att'y.

March 3, 1936.  H. A. W. KLINKHAMER  2,032,705
POLYPHASE TRANSFORMER
Filed April 20, 1934    2 Sheets-Sheet 2

Inventor:
H. A. W. Klinkhamer,
by E. F. Wenduoth
Att'y.

Patented Mar. 3, 1936

2,032,705

UNITED STATES PATENT OFFICE 2,032,705

POLYPHASE TRANSFORMER

Hendrik Abraham Wijnand Klinkhamer, Eindhoven, Netherlands, assignor to N. V. Philips' Gloeilampenfabrieken, Eindhoven, Netherlands Application April 20, 1934, Serial No. 721,635
In the Netherlands May 13, 1933

13 Claims. (Cl. 171—119)

This invention relates to polyphase transformers, and more particularly to so-called high-leakage transformers in which means are provided to obtain a strong leakage field and which consist of two or more individual or combined single-phase transformers.

I shall describe my invention particularly in connection with such transformers used in direct-current welding installations in which a multiphase alternating current is first transformed and then rectified by means of rectifier tubes, such an installation having been described in my copending application Ser. No. 602,579, filed April 1, 1932.

In most cases a three-phase network is available for the current supply, whereas in many cases—especially for smaller welding outfits—it is desirable to use only two rectifier tubes in the output. In such cases the three-phase current has to be converted into a four-phase current. In such an arrangement the feeding transformer usually consists of two single-phase transformers, preferably of two transformers whose cores have a common yoke.

The primary winding of such feeding transformers may be connected according to the well-known "Scott connection". To limit the short circuit current the transformer should have a high leakage, and as is customary in such high-leakage transformers, the secondary windings are provided on different legs of the core than are the primary windings.

I have found that in such an arrangement serious difficulties are encountered regarding proper distribution of the load between the two rectifier tubes, and even when assuming the two secondary windings be loaded with equal ohmic resistance the current in the secondary circuits would be unequal. The currents in the tubes will thus be different and such unequal distribution of current, manifests itself in such a manner that the secondary current of that single-phase transformer in which the current lags compared to the current of the other single-phase transformer, will be larger. Furthermore, the difference between these two secondary currents does not remain constant, but varies with the value of the load in such a manner that as the load increases, which can for instance be obtained by varying the leakage, this difference first increases, then with further increase in the load decreases. Upon a short-circuiting of the secondary windings the two currents become equal.

Under extreme conditions this difference between the two secondary currents, may be so large that the current in the lagging phase may have double the value of that in the leading phase.

It is evident that such unequal distribution of the current between the two secondary circuits unfavourably affects the proper functioning and economy of the installation, as well as the life of the rectifiers, etc. For instance, those rectifier tubes which carry the higher load have a much reduced life and require frequent replacement.

I have found that this unequal distribution of the secondary currents is due to the leakage fields between the windings of the two transformers and more particularly the leakage field which is coupled with the secondary windings—which leakage in the case of such high leakage transformers may assume considerable values—and which cause an undesirable coupling between the secondary windings of the two single-phase transformers.

My invention has the purpose of preventing such an unequal distribution of the load between the two secondary windings by eliminating the influence of these leakage fields, and thus avoiding the coupling by these fields of the windings of the two transformers.

According to my invention a coupling effect of the leakage field between the secondary windings of the two single-phase transformers is altogether eliminated or at least minimized by providing a short-circuited winding, which is disposed preferably at or near a point where these undesirable leakage fields have their smallest cross-section and surrounds these fields. This short-circuited winding is coupled with the leakage field which is coupled with the two secondary windings and passes through the air so that a strong current is caused to flow in the winding which causes a strong damping of the field.

In case the two single-phase transformers have a common yoke this short-circuited winding is preferably provided at this yoke, in such a manner as to surround the whole transformer as closely as possible.

The invention will be more clearly understood by reference to the accompanying drawings in which.

Figure 4:
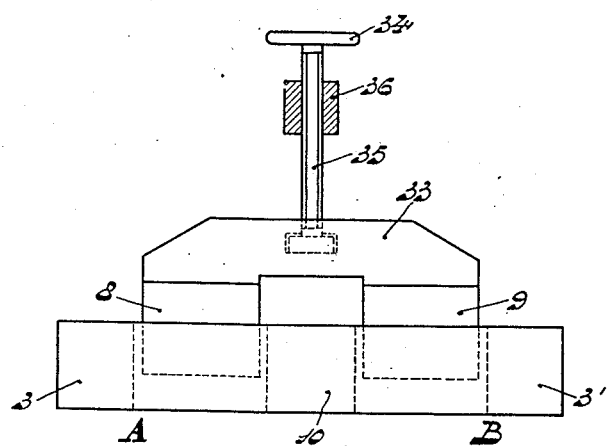

In Fig. 4 an arrangement for regulating the leakage of the transformer is shown.

Figures 1, 2:
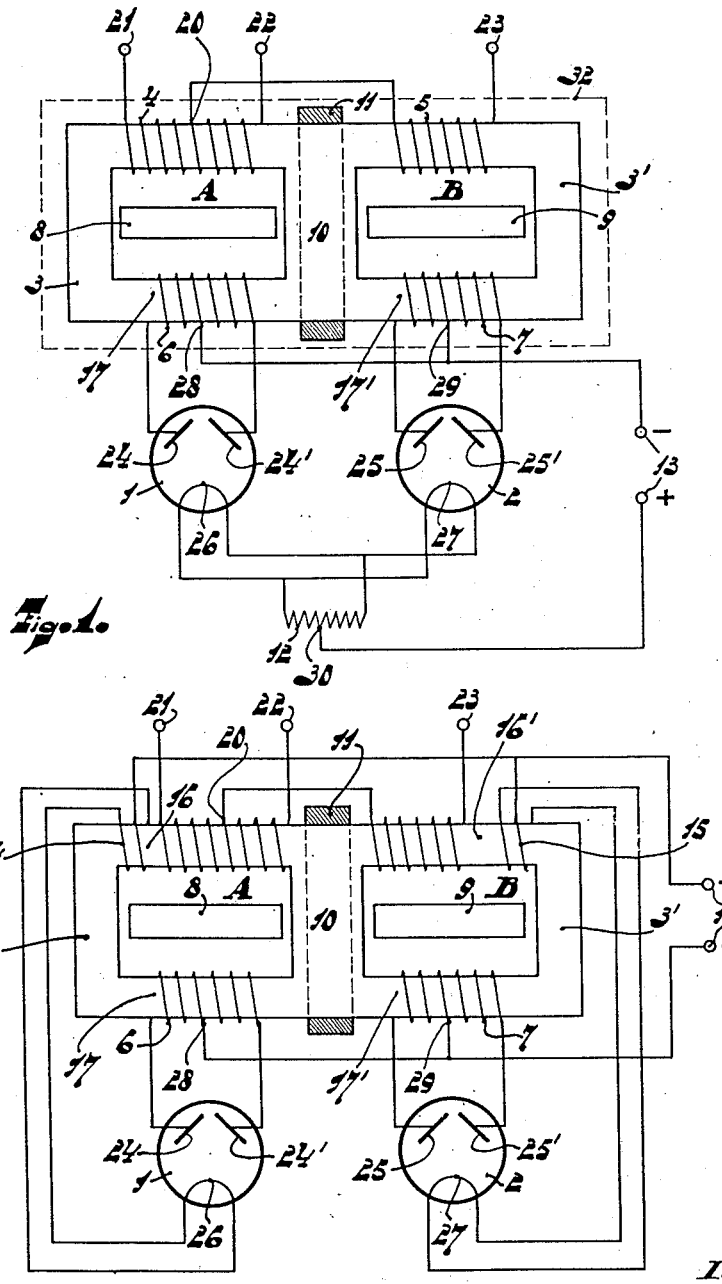
Figure 1 is a schematic drawing showing a circuit arrangement, embodying my invention in connection with the transformation of three-phase currents to four-phase currents, and as applied to a welding installation using alternating current rectified by means of rectifier tubes.
Fig. 2 is a schematic drawing similar to that of Figure 1 in which the cathodes of the rectifier tubes are supplied with a heating current by a tertiary winding provided on the main transformer.

Referring to Figure 1, a transformer comprising two single-phase portions A and B having a common yoke 10 serves for the transformation of a three-phase current into a four-phase current.

The primary windings 4 and 5 are provided on the two upper legs 16 and 16' of the transformer portions A and B respectively. The windings 4 and 5 are connected in "Scott connection" and the ratio of their turns is $$1 : \tfrac{1}{2}\sqrt{3}.$$

The winding 4 is provided in known manner with a mid-tap 20, which is connected to one end of the winding 5. The free end of winding 5 is connected to a terminal 23, and the two ends of winding 4 are connected to terminals 21 and 22, the terminals 21, 22 and 23 being the terminals for the three-phases of the network.

The secondary windings 6 and 7 of the transformer portions A and B are disposed on the lower legs 17 and 17' of the transformer cores, which cores are completed by side legs 3 and 3' respectively. The ends of the windings 6 and 7 are connected to the anodes 24—24' and 25—25' of two full-wave rectifiers 1 and 2 respectively. The cathodes 26 and 27 of the rectifiers 1 and 2 are heated by means of the secondary winding 12 of a heating transformer (not shown).

The mid-point 30 of winding 12 is connected to the positive side of a load 13, the negative side of the load being connected to mid-points 28 and 29 of the secondary windings 6 and 7 respectively. The terminals of the load 13 may represent the welding electrodes or one welding electrode and the workpiece.

The rectifier tubes 1 and 2 are preferably gas-filled tubes having a low voltage-drop, which drop also remains substantially constant with varying load. The cathodes 26 and 27 are preferably oxide cathodes. The transformer portions A and B are shown to be provided between their primary and secondary windings with magnetic shunts consisting of ferro-magnetic bridge pieces 8 and 9 which serve to control the leakage between these windings and consequently the value of the rectified current, and which are preferably adjustable.

While the transformer portions A and B are shown as having a common yoke, they may also consist of two individual transformers; however, the use of a common yoke is more economical, as it can be made smaller than the corresponding two individual yokes.

According to the invention, the intercoupling or mutual inductance created by the leakage fields between the windings of the two transformers is minimized by the provision of a short-circuited winding 11, which preferably consists of a single turn of a good conductor, for instance of a copper ring of large cross-section.

The cross-section of the winding 11 is preferably of the same order as the total copper cross-section of the individual primary windings of the transformer portions.

To obtain the greatest damping effect by means of the short-circuited winding with the smallest amount of material therefor, the winding 11 is preferably disposed at a point where the leakage fields are the smallest, thus in the present case at the common yoke 10. During operation a current is induced in the winding 11, which current may have a value of several thousand amperes and which current practically eliminates the coupling effect of the leakage fields between the transformer portions A and B.

The invention has the further advantage that due to the strong damping or suppression of the leakage fields, it is not required to take special precautions or make special provisions to keep bodies of iron or other magnetic material outside of the influence of the magnetic field of the transformer.

In the past high-leakage transformers have been usually housed in casings of non-magnetic material, for instance brass, in order to prevent the housing or the approach of other magnetizable material or other type of magnetic disturbance influence to change the value of the leakage fields. In accordance with the present invention such precautions and provisions are unnecessary—for instance, such transformers can be readily housed in less expensive iron casings. In Fig. 1 such a casing 32 is shown in dotted lines.

As has been stated, the transformer portions are provided between their primary and secondary winding with bridge-pieces of ferro-magnetic material, which form magnetic shunts, to vary the leakage and thereby to regulate the value of the output current. The use of such bridge-pieces has been known for the regulation of the leakage between the primary and secondary windings of single-phase transformers. However, such regulating means could not be applied successfully in a polyphase transformer consisting of a plurality of single-phase transformers as described above as the stray fields and accordingly the differences between the secondary currents would assume very high values in this case.

By using a short-circuited winding, in accordance with the invention, such bridge-pieces can successfully be used in a polyphase transformer and equal distribution of the secondary currents is maintained irrespective of the positions of the bridge-pieces. Were other means to be used to maintain equality of the currents in the secondary circuits, for instance, a resistance inserted in the secondary circuit having the lagging phase, equal current distribution could be obtained only at a given value of the load, but could not be maintained for different values of the load.

Regulation of the current intensity by means of adjustable magnetic shunts in the form of bridge-pieces is preferable to other methods of current regulation, being less expensive and more convenient than other regulating means, for instance, than adjustable choke-coils provided in the primary windings of the feeding transformer.

In Fig. 4 such an arrangement for regulating the leakage by means of adjustable magnetic shunts is shown. The shunts 8 and 9 are mounted on a common support 33 which support is rotatably mounted on a threaded bar 35. The bar is lead through a fixed nut 36, by means of a handwheel 34. The support and the magnetic shunts can be moved up and down whereby the strong field is varied.

Thus the present invention also renders possible the regulation of the secondary current by means of simple adjustable magnetic shunts, also in the case of polyphase transformers, which not only provides for a simple, convenient and inexpensive method of regulation, but also provides for a balanced load in the secondary circuits, irrespective of the value of the load.

A further advantage of such an arrangement is that the secondary currents equality is maintained irrespective of the manner in which the phases of the network are connected.

The arrangement shown in Fig. 2 is similar to that of Figure 1 except that instead of providing a separate heating transformer for the cathodes 26 and 27, separate low-voltage tertiary windings 14 and 15 are provided on the transformer portions A and B, which are preferably disposed on the legs 16—16' of the cores, adjacent to the primary windings 4 and 5.

The invention is not restricted to single-phase transformers having a common yoke, but applies equally well to an arrangement in which the yokes of individual transformers are placed side by side. The short-circuited winding is disposed at these yokes, and preferably at the smallest cross-section of the leakage fields.

Nor is the invention limited to transformers used in the conversion of three-phase current into four-phase current, but can be equally well applied to the transformation of other types of polyphase currents, for instance in the transformation of three-phase current into another type of three-phase current, or of a four-phase current into another type of four-phase current. In all such arrangements a plurality of individual or combined single-phase leakage transformers may be used and the mutual inductance or cross leakage between the windings of the individual transformers suppressed by the use of a short-circuited winding provided in accordance with the invention.

It should also be well understood that in case the polyphase transformer comprises more than two single-phase transformers, more than one short-circuited winding is used; as a rule, one short-circuited winding is required to be placed at the yoke or yokes of two adjacent single-phase transformers.

Figure 3:
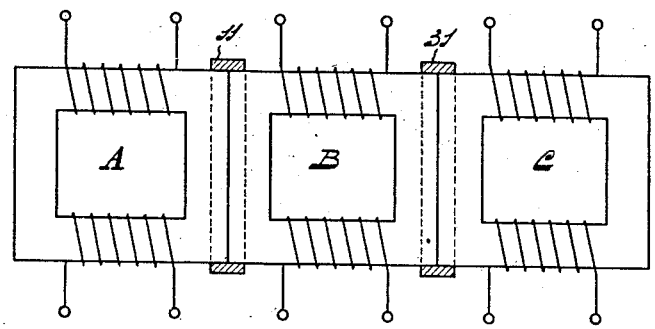
Fig. 3 is a schematic drawing showing a transformer according to the invention consisting of three single-phase transformers.

Fig. 3 shows a three-phase transformer consisting of three single-phase transformers A, B and C wherein two short-circuited windings 11 and 31 are provided for suppressing the leakage fields which couple the windings of each two adjacent transformers.

While I have described my invention in connection with specific examples and in specific applications, I do not wish to be limited thereto, but desire the appended claims to be construed as broadly as permissible in view of the prior art.

What I claim is:

1. A polyphase transformer assembly comprising a plurality of single-phase high-leakage transformers each having at least one yoke on which no winding is provided, one of the said yokes of each transformer being adjacent to such a yoke of another transformer, and means to suppress the leakage fields coupling the windings of adjacent transformers, said means including a short-circuited winding disposed in the proximity of the adjacent yokes and surrounding the transformers.

2. A polyphase transformer assembly comprising a plurality of single-phase transformers each having a magnetic core of substantially rectangular form, a yoke of each transformer being adjacent to a yoke of another of said transformers, windings for said transformers being disposed on the yokes which are perpendicular to the first said yokes, each secondary winding being disposed on a different yoke from the corresponding primary winding and means to suppress the leakage fields coupling the windings of adjacent transformers, said means including a short-circuited winding disposed in the proximity of the adjacent yokes and surrounding the transformers.

3. A polyphase transformer assembly comprising a plurality of adjacently disposed, single-phase high-leakage transformers, windings for said transformers, adjacent transformers having a common yoke, and means to suppress the leakage field coupling the windings of adjacent transformers, said means including a short-circuited winding provided at the common yoke and closely surrounding the transformers.

4. A polyphase transformer assembly for converting three-phase current into symmetrical four-phase current, said assembly comprising two single-phase, high-leakage transformers, a core for each of said transformers, said cores having a common flux path, and primary and secondary windings for said transformers, the primary and secondary windings of each transformer being provided on different legs of its core, and a short-circuited winding surrounding the assembly around said common flux path.

5. A polyphase transformer assembly comprising a plurality of adjacently disposed single-phase high-leakage transformers, windings for said transformers, and means to suppress the leakage fields coupling the windings of adjacent transformers, said means including at least one short-circuited winding, disposed in the proximity of the smallest cross-section of said leakage fields, said short-circuited winding having a conductive cross-section of the same order as the conductive cross-section of the individual transformer windings.

6. A polyphase transformer assembly comprising a plurality of single-phase transformers, adjacent transformers having a common yoke, windings for said transformers disposed on the part of the cores which are perpendicular to the said common yoke, the secondary and primary windings being disposed on separated parts of the core and means to suppress the leakage fields coupling the windings of adjacent transformers, said means including a short-circuited winding disposed in the proximity of the common yoke and surrounding the transformers.

7. A polyphase transformer assembly comprising a plurality of adjacently disposed single-phase, high-leakage transformers, a primary and a secondary winding for each of said transformers, and means to suppress the leakage fields coupling the windings of adjacent transformers, said means including at least one short-circuited winding disposed in the proximity of the smallest cross-section of said leakage fields, and adjustable magnetic shunts disposed between the primary and secondary windings of each of said transformers.

8. A polyphase transformer assembly comprising a plurality of single phase transformers, adjacent transformers having a common yoke, windings for said transformers disposed on the part of the cores which are perpendicular to the said common yoke, the primary and secondary windings being disposed on different parts of the core and means to suppress the leakage fields coupling the windings of adjacent transformers, said means including a short-circuited winding disposed in the proximity of the common yoke and surrounding the transformers, and adjustable magnetic shunts disposed between the primary and secondary of each of said transformers.

9. A polyphase transformer assembly comprising two single-phase portions, a core for each of said portions, said cores having a substantially rectangular shape and including a common yoke, a primary and a secondary winding for each of said portions, the primary and secondary winding of each portion being provided on different legs of its core, and a short-circuited winding surrounding the assembly at said yoke.

10. A polyphase transformer assembly comprising two single-phase portions, a core for each of said portions, said cores having a substantially rectangular shape and including a common yoke, a primary winding and a secondary winding for each of said portions, said windings being coaxially disposed one on each of the two core legs, which are perpendicular to the yoke, and a short-circuited winding surrounding the assembly at said yoke.

11. A polyphase transformer assembly comprising a plurality of linearly-arranged single-phase high-leakage transformers having windings, and means to suppress the leakage field coupling the windings of successive transformers, said means including a short-circuited winding closely surrounding the transformer assembly and coupled with said leakage field.

12. A polyphase transformer assembly comprising a plurality of adjacently-disposed single-phase high-leakage transformers having windings, and means to suppress the leakage field coupling the windings of adjacent transformers, said means including a short-circuited winding closely surrounding the transformer assembly and coupled with the leakage field.

13. A polyphase transformer assembly comprising a plurality of single-phase transformers, each of said transformers having a substantially rectangular magnetic circuit, primary windings and secondary windings, the primary and secondary windings of each transformer being oppositely arranged on the magnetic circuit, said transformers being arranged with the primary windings in axial alignment and with the secondary windings in axial alignment, and means to suppress the leakage field coupling the windings of successive transformers, said means comprising a closed electric circuit disposed perpendicularly to the winding axes and closely surrounding the assembly between the windings of successive transformers.

HENDRIK ABRAHAM
WIJNAND KLINKHAMER.